No. 752,947. Patented February 23, 1904.

UNITED STATES PATENT OFFICE.

WILHELM BÄUML, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION OF BADEN.

PROCESS OF MAKING ORGANIC ACID COMPOUNDS.

SPECIFICATION forming part of Letters Patent No. 752,947, dated February 23, 1904.

Application filed November 13, 1902. Serial No. 131,249. (No specimens.)

*To all whom it may concern:*

Be it known that I, WILHELM BÄUML, chemist, a subject of the Emperor of Austria-Hungary, residing at Ludwigshafen-on-the-Rhine, in the Kingdom of Bavaria, Empire of Germany, have invented new and useful Improvements in the Manufacture of Organic Acid Compounds, of which the following is a specification.

This invention relates to the manufacture of organic acid compounds by the use of a salt of chlorsulfonic acid.

Experiments hitherto made by other investigators in the treatment of organic acids or their salts with free chlorsulfonic acid have led to no result or have yielded exceedingly small quantities of acid chlorid, so that no commercial process for the manufacture of organic acid compounds can be based upon any such treatment.

I have discovered that by treating a salt of an organic acid with a salt of chlorsulfonic acid the organic acid chlorid is formed, and as it is well known that the acid chlorids react with the salts of organic acids to yield the acid anhydrids by suitably arranging the proportion of the salt of chlorsulfonic acid to the salt of the organic acid employed the formation of an acid anhydrid can be effected smoothly and with a good yield in one operation.

If desired, the free organic acid can be employed instead of a salt thereof.

The following examples will further illustrate my invention. The parts are by weight, and the temperatures are given in degrees centigrade.

*Example 1—Preparation of acetic anhydrid.*—Intimately mix together one hundred and fifty (150) parts of the sodium salt of chlorsulfonic acid and one hundred and seventy (170) parts of anhydrous sodium acetate and warm the mixture. At about seventy degrees (70°) reaction, with the evolution of a considerable amount of heat, takes place and a part of the acetic anhydrid formed distils over. The remainder can be distilled off by gradually heating to about two hundred and fifty degrees, (250°.)

*Example 2—Preparation of acetyl chlorid.*—Intimately mix together one hundred and eighty (180) parts of the sodium salt of chlorsulfonic acid and eighty (80) parts of anhydrous sodium acetate or sixty (60) parts of glacial acetic acid (as free as possible from water) and warm the mixture. The acetyl chlorid formed distils over.

In a similar manner benzoic anhydrid or benzoyl chlorid can be obtained.

I claim—

1. The process of manufacturing organic acid compounds by acting on an organic acid with a salt of chlorsulfonic acid.

2. The process of manufacturing organic acid compounds by treating a salt of an organic acid with a salt of chlorsulfonic acid.

3. The process of manufacturing acid anhydrid by acting on acetic acid with a salt of chlorsulfonic acid.

4. The process of manufacturing acid anhydrids by acting on an acetate with a salt of chlorsulfonic acid.

5. The process of manufacturing acetic anhydrid by acting on an acetate with the sodium salt of chlorsulfonic acid.

In testimony whereof I have hereunto set my hand in the presence of two subscribing witnesses.

WILHELM BÄUML.

Witnesses:
JOHN L. HEINKE,
JACOB ADRIAN.